United States Patent [19]

Gillberg-LaForce

[11] Patent Number: 4,514,438

[45] Date of Patent: Apr. 30, 1985

[54] USE OF RADIATION-CURABLE ACRYLATES TO SURFACE MODIFY POLYETHYLENE TEREPHTHALATE TO IMPROVE ADHESION TO STANDARD RUBBER ADHESIVES AND THEREBY TO RUBBER-BASED MATERIALS

[75] Inventor: Gunilla E. Gillberg-LaForce, Summit, N.J.

[73] Assignee: Celanese Corporation, New York, N.Y.

[21] Appl. No.: 440,882

[22] Filed: Nov. 12, 1982

[51] Int. Cl.³ ............................ C08J 7/18; C08L 9/08; C08L 61/06; C08L 67/02

[52] U.S. Cl. ................................ 427/54.1; 427/407.1; 525/133

[58] Field of Search ............................ 427/54.1, 407.1; 525/133

[56] References Cited

U.S. PATENT DOCUMENTS

| | | | |
|---|---|---|---|
| 3,419,463 | 12/1968 | Timmons | 428/480 |
| 3,516,897 | 6/1970 | Brodnyan | 428/483 |
| 3,551,246 | 12/1970 | Bassimir et al. | 428/480 |
| 3,755,165 | 8/1973 | Bhakuni et al. | 156/161 |
| 3,951,723 | 4/1976 | Wright | 427/407.1 |
| 3,968,295 | 6/1976 | Solomon | 427/175 |
| 4,031,288 | 6/1977 | Bhakuni et al. | 428/395 |
| 4,054,634 | 10/1977 | Marshall et al. | 427/407.1 |
| 4,363,689 | 12/1982 | Roesler | 427/407.1 |

*Primary Examiner*—Allan M. Lieberman
*Attorney, Agent, or Firm*—Burns, Doane, Swecker & Mathis

[57] ABSTRACT

A polyethylene terephthalate material (e.g., a filament or cord) is disclosed that exhibits desirable adhesive characteristics in rubber-reinforcing applications. An important aspect of the invention is the incorporation of a radiation-curable acrylate monomer in a spin finish coating or as a coating applied upon a spin finish coating, and the subsequent photopolymerization of the acrylate monomer by exposure of the coated filament or cord to a suitable radiation source. The surface-modified material thus shows an improved adhesion to phenolicformaldehyde-latex adhesives.

35 Claims, No Drawings

USE OF RADIATION-CURABLE ACRYLATES TO SURFACE MODIFY POLYETHYLENE TEREPHTHALATE TO IMPROVE ADHESION TO STANDARD RUBBER ADHESIVES AND THEREBY TO RUBBER-BASED MATERIALS

BACKGROUND OF THE INVENTION

The present invention relates to the production of surface-modified polyethylene terephthalate materials which are desirably adapted for use as reinforcing substrates in rubber-based products.

As discussed in U.S. Pat. Nos. 3,419,463; 3,729,336; and 3,755,165 regarding the manufacture of rubber goods requiring cord reinforcement, such as in pneumatic tires, friction belts and the like, the strength and durability of the adhesive bond between the reinforcing cord and the rubber being reinforced is important. The reinforcing cord serves to increase the tensile strength of the rubber-based goods and restrict the degree of distortion during use. The reinforcing cord is normally placed within the rubber mass and must be firmly bonded to the rubber to provide a unitary structure. Stress will occur at the interface between the reinforcing element and the rubber during use. Accordingly, good bond strength and adhesion is needed to prevent separation at the interface.

Polyester reinforcing materials are increasingly being employed in the reinforcement of such rubber-based goods, and particularly as tire cord in the manufacture of rubber tires. These polyester reinforcing materials (e.g., polyethylene terephthalate filament or cord) possess physical characteristics such as high strength, flex resistance, high stretching modulus and low creep which make them outstanding materials for such reinforcement. However, the use of polyester reinforcing materials in rubber reinforcement applications is subject to certain problems due to the poor rubber adhesion properties associated with unmodified polyester materials.

The use of aqueous dispersions containing a combination of a resorcinol-formaldehyde condensate and a vinyl pyridine latex (referred to as an RFL dip) is best known as an effective treating agent for improving the rubber adhesion of some synthetic polymer reinforcing materials, such as nylon. However, the RFL dips do not satisfactorily overcome the problems encountered with unmodified polyester reinforcing material adhesion.

Attempts have been made to find new treating agents to improve the rubber adhesion of polyester reinforcing materials or, in the alternative, to treat the polyester with additional agents in combination with the RFL dip treatment to improve the adhesion. For example, U.S. Pat. No. 3,383,242 discloses pretreatment of polyethylene terephthalate yarn by use of an aqueous dispersion of a curable combination of a diglycidic ether of an aliphatic diol and an amine curing agent and a water-dispersible lubricating agent. U.S. Pat. No. 3,755,165 discloses a tire yarn finish composition consisting of a lubricating oil, an antistatic agent, an emulsifier, water and as an adhesive promoting agent an aliphatic diisocyanate. U.S. Pat. No. 3,419,463 discloses a method for treatment of polyester materials comprising application of an alkyl aromatic acid ester followed by RFL. U.S. Pat. No. 3,834,934 discloses an adhesive composition for fibrous material comprising an admixture of RFL and a triallyl cyanurate-resorcinol-formaldehyde reaction product. U.S. Pat. No. 3,729,336 discloses treatment of polyester fibers with a composition of a copolymer comprising crystallizable ester units identical to those in the polyester fiber, polyoxyalkylene groups and polyepoxy containing groups and a polyepoxide followed by application of RFL. U.S. Pat. No. 4,031,288 discloses pretreatment of tire cord with a solvent solution of a polyisocyanate followed by application of an adhesive such as RFL. U.S. Pat. No. 3,968,295 discloses a tire cord dip composition including latex and an acrylic ester copolymer containing acrylic acid and methylol acrylamide. U.S. Pat. No. 4,187,349 discloses an adhesive system for polyester tire cord comprising a heat-curable admixture of a polyepoxide and a linear carbon-to-carbon addition polymer containing pendent aminimide and N-pyrrolidonyl groups. U.S. Pat. No. 4,210,475 discloses a tire cord dip comprised of a rubbery vinyl pyridine/styrene/butadiene copolymer and a lignin amine-resorcinol-formaldehyde reaction product. U.S. Pat. No. 3,516,897 discloses a rubber reinforcing material having an adhesive thereon comprising a copolymer of methyl acrylate, hydroxyalkyl acrylate or methacrylate and an ethylenically unsaturated carboxylate group containing monomeric material together with a blend of a phenolic-aldehyde resin and a rubber latex.

Although many of these prior art treatments can be said to increase the adhesion between the polyester and the rubber, in many instances the improvement is only slight. In addition, certain prior art treatments require a number of steps and are not economical, and in others, the treatments adversely affect other properties of the reinforced article, such as, for example, causing a hardening or stiffening of the article and adversely affecting further processing.

OBJECTS AND SUMMARY OF THE INVENTION

Accordingly, it is an object of the present invention to provide a process for treatment and surface modification of polyester materials whereby the polyester materials have improved adhesion to phenolic-aldehyde-latex adhesives or other types of rubber adhesives.

It is another object of this invention to provide multi-coated polyethylene terephthalate filament and yarn products which exhibit improved adhesive properties in rubber-reinforcement applications.

It is a further object of the invention to provide rubber-based articles which are reinforced with a novel type of strongly adherent polyethylene terephthalate fiber material.

In one aspect of the present invention, there is thus provided a process for treatment of a polyethylene terephthalate material for improved adhesion in subsequent rubber-reinforcing applications which comprises (1) applying to the surface of the material at least one radiationcurable acrylate monomer, and photopolymerizing said at least one acrylate monomer by exposure of the acrylatemodified material to a radiation source; and (2) applying a phenolic-aldehyde-latex adhesive to said acrylate-modified material.

In another aspect of the present invention, there is thus provided a process for treatment of a polyethylene terephthalate filament or yarn for improved adhesion in subsequent rubber reinforcing applications which comprises (1) applying a spin finish coating to the filament or yarn surface; (2) applying at least one radiation-curable acrylate monomer to the filament or yarn, and photopolymerizing said at least one acrylate monomer by exposure of the filament or yarn to a radiation source; and (3) applying a phenolic-aldehyde-latex adhesive to the filament or yarn.

In yet another aspect of the present invention, there is provided a process for the treatment of a polyethylene material to improve the adhesion thereof to rubber-based materials comprising applying an adhesive composition comprising a resorcinol-formaldehyde condensate and a vinyl pyridine latex to the surface of said polyethylene material, the improvement comprising pretreating said polyethylene material prior to application of said adhesive composition by applying to the surface thereof at least one radiation-curable acrylate monomer and photopolymerizing said at least one acrylate monomer by exposure of the material to a radiation source.

In still yet another aspect of the present invention, polyethylene terephthalate materials treated according to the above process are provided.

DETAILED DESCRIPTION OF THE INVENTION

In accordance with the present invention, a polyethylene terephthalate material is treated with at least one radiation-curable acrylate monomer. Such polyethylene terephthalate materials may take many forms including but not being limited to filaments, fibers, threads, yarns, cords, etc. The acrylate monomer can advantageously be applied to the surface thereof as part of a spin finish or subsequent to application of a spin finish.

The term "spin finish" as employed herein is intended to include compositions which are normally employed to the fiber industry for lubrication of filaments or yarns during textile operations; i.e., during the spinning and weaving or otherwise fabricating individual filaments or staple fibers into various textile articles. In addition to the essential lubricating agent and its solvent or emulsifying liquid such as water, small amounts of other modifying agents may also be present. Generally, spin finishes comprise a lubricating oil, an antistatic agent, and an emulsifier.

Suitable lubricating oils include but are not limited to substances such as palm oil, coconut oil, cottonseed oil, mineral oil, glycerides, polyglycol esters, butyl stearate, octyl stearate, esters of oleic acid, trimethylolpropane/-caprylic acid esters, 2-methyl-2-propylpropane-1,3-diol-dilaurate, 2-ethyl-2-butyl-propane-1,3-dioldilaurate, polysiloxanes and the like.

The spin finish may contain an antistatic agent to reduce the electrostatic charge of the filament during its processing into a cord or fabric. Useful agents include cationic compounds containing a quaternary ammonium-, pyridinium-, imidazolinium-, and quinolinium function, and phosphated alcohols, ethyloxated amides, and the like.

The lubricant is preferably dispersed in water with the aid of an emulsifying agent including surface active organic compounds such as the polyoxyethylene adducts of fatty acids, higher fatty alcohols, sorbitol esters and sorbitans as well as phosphate esters, sulfonated aromatic petroleum hydrocarbons, sulfonated naphthenates, sulfated vegetable oils, polyglycerol esters, glycerol mono-di-fatty acid esters, and the like.

The spin finish is applied to the polyester filaments or yarn in the form of a dilute aqueous solution or as neat oils. The dry weight of spin finish on the polyester will vary between about 0.1 to 5 weight percent, based on the weight of filament or yarn.

In accordance with one embodiment of the present invention, an effective quantity of radiation-curable acrylate monomer is incorporated as a component of the spin finish composition before it is coated on the surface of the polyethylene terephthalate filament or yarn.

A typical water dilutable spin finish will contain the following proportions of ingredients, based on the total weight of ingredients present:

| | |
|---|---|
| Lubricant | 20 to 60% |
| Antistatic agent | 0.5 to 25% |
| Emulsifier | 5 to 50% |
| Acrylate Monomers | 2 to 20% |

In accordance with another aspect of the present invention, the at least one acrylate monomer is applied subsequent to the spin finish. For example, the acrylate monomer is dissolved in a solvent such as acetone or isopropanol and applied to the filament or yarn by spraying, dipping or padding. The acrylate monomer is applied in a quantity between about 0.05 to 2 weight percent of acrylate monomer, based on the weight of filament or yarn.

The application of the spin finish or separate acrylate monomer or monomers to the polyethylene terephthalate filament or yarn can be accomplished by means of a kiss roll which is normally used for the application of spinning preparations. The spin finish and acrylate monomer solution can be applied successively by an arrangement of two kiss rolls. It is surprising and unexpected that the acrylate monomer can be employed successfully even when applied subsequent to or admixed with the spin finish. Such a property permits ease of application without loss of effectiveness.

The term radiation-curable "acrylate monomer" as employed herein is meant to include acrylic acid esters, methacrylic acid esters and itaconic acid esters such as butyl acrylate, ethylene glycol diitaconate, 1,6-hexanediol diacrylate, 1,6-hexanediol dimethacrylate, trimethylolpropane triacrylate, trimethylolpropane trimethacrylate, pentaerythritol tetracrylate, pentaerythritol tetramethacrylate, pentaerythritol triacrylate, dipentaerythritol monohydroxy pentaacrylate, 1,3-butyleneglycol diacrylate, 1,4-butenediol diacrylate, 2,2-dimethylpropane 1,,3-diacrylate, diethyleneglycol diacrylate, tetraethyleneglycol diacrylate, polyethyleneglycol diacrylate, diallyl fumarate, allyl methacrylate, 1,3-butyleneglycol dimethacrylate, ethyleneglycol dimethacrylate, diethyleneglycol dimethacrylate, triethyleneglycol dimethacrylate, tetraethyleneglycol dimethacrylate, polyethyleneglycol dimethacrylate, ethoxylated bisphenol A dimethacrylate, and the like. Such monomers are known per se in the art. See, for example, U.S. Pat. No. 3,551,246, herein incorporated by reference. Mixtures of such monomers may also be employed to modify the polyethylene material.

The above-described radiation-curable acrylate monomers can be obtained by the ester interchange method of interacting an ester of the acid and a volatile alcohol with a polyhydric alcohol in the presence of a suitable catalyst, or by the direct reaction of a polyhydric alcohol with a suitable acid or acid halide.

The acrylate monomer component in the applied coating is photopolymerized by exposure to a suitable radiation source. Any suitable source of radiation may be employed, such as a 100-watt Hanovia high pressure mercury arc quartz ultraviolet lamp, a linear electron accelerator, a gamma radiation emitter such as cobalt-60, and the like.

The amount of radiation required depends primarily upon the type and concentration of acrylate monomer and the level of curing desired. Suitable doses of electron beam radiation include 1 megarad to about 20 megarads, preferably about 2 megarads to about 10 megarads. Suitable UV radiation doses are those received by a 1.5 mil thick coating passing under a medium pressure mercury lamp rated at 200 watts per inch at line speeds of about 10 to about 800 feet per minute, the preferred range being 25 to 400 feet per minute.

When the radiation source is ultraviolet light, it is advantageous to employ one or more photoinitiators in combination with the radiation-curable acrylate monomer component when the applied acrylic monomer is contained either in the spin finish first or applied separately to the polyester filament or yarn.

The photoinitiator is employed in a quantity of between about 1 to 15 weight percent, based on the total weight of photopolymerizable acrylate monomer component in a coating. Illustrative of photoinitiators include but are not limited to benzophenone, propiophenone, cyclopropyl phenyl ketone, acetophenone, 1,3,5-triacetylbenzene, benzaldehyde, thioxanthane, anthraquinone, beta-naphthyl phenyl ketone, beta-naphthaldehyde, beta-acetonaphthone, 2,3-pentanedione, benzil, fluoronone, pyrene, benzanthrone, anthracene, benzoin methyl ether, desyl bromide, desylamine, and the like.

It is believed that the unique adhesive properties exhibited by surface-modified polyethylene terephthalate materials prepared in accordance with the present invention are at least partially attributable to interaction and photopolymerization between free radicals in the polyethylene terephthalate surface and free radicals in the radiation-curable acrylate molecules.

After the at least one acrylate monomer has been photopolymerized to provide the desired degree of crosslinking, a phenolic-aldehyde-latex adhesive is superimposed on the modified article (e.g., filament or yarn).

The term "phenolic-aldehyde-latex adhesive" is meant to include phenolic-aldehyde-latex containing compositions which are known and used in the textile and rubber industries for bonding of polyester fibers to rubber. The phenolic-aldehyde component (e.g., a resole) can be any condensation product of an aldehyde with a phenol which can be heat-cured to form an infusible material. A typical phenolic-aldehyde-latex adhesive composition is a formulation containing resorcinol-formaldehyde resin and a rubber latex such as a vinyl pyridine latex (e.g., a RFL adhesive). The preparation of an RFL adhesive formulation is described in Example 2.

The phenolic-aldehyde-latex adhesive is applied in a quantity between about 2 to 20 weight percent (solids retention), based on the weight of the polyester material.

The phenolic-aldehyde-latex adhesive is preferably applied after the filament or yarn has been spun into cord or woven into fabric. Preferably, the adhesive-coated material is subjected to a drying and curing treatment, both to eliminate the moisture in the coating and to complete the condensation of the phenolic-aldehyde component. The drying and curing operation is conveniently conducted in the presence of hot circulating air at a temperature of between about 120° to 260° C.

The surface-modified, strongly adherent polyester materials of the present invention are useful as reinforcing materials in the preparation of reinforced rubber-based materials such as pneumatic tires, conveyor belts, hoses, transmission belts, raincoats, and the like.

The following examples are further illustrative of the present invention. The reactants and other specific ingredients are presented as being typical, and various modifications can be derived in view of the foregoing disclosure without departing from the scope of the invention.

EXAMPLE 1

This Example illustrates the preparation of a conventional spin finish composition as well as a spin finish composition of the present invention containing an acrylate monomer adhesive activator component.

A spin finish base was prepared by mixing 50 percent by weight of a polysiloxane lubricant, 1 percent by weight of a phosphated alcohol antistatic agent and 49 percent by weight of a mixture of ethoxylated emulsifiers based on sorbitan monooleate and alkyl phenols. A clear transparent spin finish was obtained at a dilution of 15 percent solids in water.

A spin finish composition containing a radiationcurable acrylate monomer was prepared by adding 25 to 60 percent by weight of a 1:1 mixture of pentaerythritol triacrylate and tetraethyleneglycol diacrylate to the spin finish described above. Optionally, 1 to 3 percent by weight of a photoinitiator as benzophenone is also added to the spin finish. A stable spin finish is obtained at a dilution with water to 15 percent solids.

EXAMPLE 2

This Example illustrates the preparation of a resorcinol-formaldehyde-latex (RFL) adhesive composition using the following ingredients:

| Ingredients | Parts By Wt |
| --- | --- |
| NaOH (50%) | 2.6 |
| Resorcinol | 16.6 |
| Formaldehyde (37%) | 17.2 |
| Terpolymer rubber latex of styrene/butadiene-1,2/vinylpyridine 15/70/15 (41%) | 245 |
| Water | 331 |

The adhesive composition is prepared by adding 16.6 parts of the resorcinol to 331 parts of water, followed by the addition of 17.2 parts of formaldehyde (37%) and 2.6 parts of 50% NaOH. The resulting mixture is aged for one hour and then 245 parts of terpolymer rubber latex are added. The resulting mixture is aged for a period of 72 hours.

EXAMPLE 3

This Example illustrates the preparation of multicoated polyethylene terephthalate yarn and cord in accordance with the present invention.

A 1000/192 polyethylene terephthalate tire yarn is made using a continuous spin draw process such as described in U.S. Pat. No. 4,044,189. The yarn is contacted after extrusion from the spinneret with a spin finish prepared in the manner of Example 1 and then passed over pretension, feed and draw rolls to produce a yarn with the desired physical properties. After the final draw, the yarn is taken up on a wind-up unit. If the spin finish does not contain a radiation-curable acrylate, the draw yarn is passed into contact with a second finish applicator (i.e., of kiss roll type) where an acrylate-containing composition is applied. The acrylate is applied with a solution of 10 percent by weight of pentaerythritol triacrylate in isopropanol containing 0.3 weight percent of benzophenone (photoinitiator) and 0.2 weight percent dimethylaminoethanol to apply approximately 0.3 percent acrylate on the yarn. The surface modified yarn is either collected on a spool or directly photopolymerized by exposure to a suitable UV radiation source and then taken up on a spool or beam.

Additional samples of a yarn produced by the above process and pretreated with a spin finish in the same manner were treated with 0.3 percent by weight of a 1:1 mixture of pentaerythritol acrylate and tetraethyleneglycol diacrylate and in the presence of 3 percent by weight benzophenone and 2 percent by weight dimethylaminoethanol based on the weight of the acrylate and exposed to a 300 watt/inch mercury lamp at a speed of approximately 40 feet/minute.

Further spin finish-coated yarn samples were coated with 0.33 percent by weight acrylate (pentaerythritol acrylate and tetraethyleneglycol diacrylate in a ratio of 1:2) and exposed to a dose of 1.2 Mrads of a speed of 500 feet/minute by passing through an Energy Science, Inc. Electro-Curtin$^R$ processor.

EXAMPLE 4

This Example illustrates the advantageous properties of a rubber product reinforced with the improved surface-modified polyethylene terephthalate of the present invention and the RFL composition of Example 2.

The adhesive characteristics of polyethylene terephthalate cord produced in accordance with the present invention are determined according to an "H" adhesion test wherein a single treated cord is molded into a strip of rubber. The force which is required to pull the cord from the specimen is indicative of the degree of adhesion of the treated cord to the rubber. The specific test procedure is described more fully below.

An appropriate number of rubber strips are cut of dimension 0.25 inch by 6.5 inches. The strips are placed in mold cavities, with polyethylene terephthalate cord treated according to the method of Example 3 placed in the mold cord slots and secured under pressure. Additional rubber strips are then placed in the mold upon the strips already present in the mold. The mold is covered with a smooth metal plate and placed in a steam heated press for curing. The mold is then removed from the press and the molded rubber stock specimen removed from the mold.

The specimen is cut to produce "H"-shaped specimens consisting of a cord with each end embedded in the center of a rubber tab one inch in length. An Instron Model 1130 tester is employed having a crosshead speed of 6 inches/minute and a gauge length appropriately sized to correspond to the size of the tab to measure the force required to separate the cord from one of the rubber ends. The UV-cured sample of Example 3 exhibited a 0.25 inch "H" adhesion of 33.8 pounds and the electron beam-cured sample of 28.5 pounds. These values compare favorably with a standard epoxy adhesive activated tire yarn which gave a 0.25 inch "H" adhesion of 34.2 pounds, while a non-adhesive activated control gave a 0.25 inch "H" adhesion of only 18.7 pounds.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for the surface modification of a polyethylene terephthalate material to provide improved adhesion in subsequent rubber-reinforcing applications which comprises (1) applying to the surface of said material at least one radiation-curable acrylate monomer and photopolymerizing said at least one acrylate monomer by exposure of the material to a radiation source to obtain surface modification of said polyethylene terephthalate material; and (2) applying a phenolic-aldehyde-latex adhesive to said acrylate-modified material wherein improved adhesion to rubber is attained.

2. The process of claim 1 wherein said polyethylene terephthalate material comprises a filament or yarn.

3. The process of claim 2 wherein said step (1) comprises applying a spin finish coating containing said acrylate monomer.

4. The process of claim 3 wherein the step (1) spin finish coating is applied in a quantity between about 0.1 to 5 weight percent, based on the weight of filament or yarn.

5. The process of claim 3 wherein the step (1) acrylate monomer is applied in a quantity between about 0.05 to 2 weight percent, based on the weight of filament or yarn.

6. The process of claim 1 wherein the step (1) acrylate monomer is a polyol polyacrylate compound.

7. The process of claim 1 wherein the step (1) acrylate monomer is a pentaerythritol polyacrylate compound.

8. The process of claim 1 wherein the step (1) acrylate monomer is pentaerythritol triacrylate.

9. The process of claim 1 wherein the step (1) acrylate monomer is tetraethyleneglycol diacrylate.

10. The process of claim 1 wherein the step (2) adhesive is cured by heat treatment.

11. The process of claim 1 wherein the yarn from step (1) is spun into cord prior to the application of the step (2) adhesive.

12. A process for pretreating polyethylene terephthalate filament or yarn to attain improved adhesion in subsequent rubber reinforcing applications which comprises (1) applying a spin finish to the filament or yarn; (2) applying at least one radiation-curable acrylate monomer to said filament or yarn and photopolymerizing said at least one acrylate monomer by exposure of the filament or yarn to a radiation source to obtain surface modification of said polyethylene terephthalate filament or yarn; and (3) applying a phenolic-aldehyde-latex adhesive to said filament or yarn wherein improved adhesion to rubber is attained.

13. The process of claim 12 wherein the step (1) spin finish is applied in a quantity of between about 0.1 to 5 weight percent, based on the weight of yarn.

14. The process of claim 12 wherein the step (2) acrylate monomer is applied in a quantity of between about 0.05 to 2 weight percent, based on the weight of yarn.

15. The process of claim 12 wherein the step (2) acrylate monomer is a polyol polyacrylate compound.

16. The process of claim 12 wherein the step (2) acrylate monomer is a pentaerythritol polyacrylate compound.

17. The process of claim 12 wherein the step (2) acrylate monomer is pentaerythritol triacrylate.

18. The process of claim 12 wherein the step (2) acrylate monomer is tetraethyleneglycol diacrylate.

19. The process of claim 12 wherein the step (3) adhesive is applied in a quantity of between about 2 to 20 weight percent, based on the weight of yarn.

20. The process of claim 12 wherein the step (3) adhesive comprises resorcinol-fomaldehyde-rubber latex solids.

21. The process of claim 12 wherein the step (3) adhesive is cured by heat treatment.

22. The process of claim 12 wherein the yarn from step (2) is spun into cord prior to the application of the step (3) adhesive.

23. A pretreated polyethylene terephthalate filament prepared in accordance with the process of claim 1.

24. A pretreated polyethylene terephthalate filament prepared in accordance with the process of claim 12.

25. In a process for the treatment of a polyethylene terephthalate material to improve the adhesion thereof to rubber-based materials comprising applying an adhesive composition comprising a resorcinol-formaldehyde condensate and a vinyl pyridine latex to the surface of said polyethylene terephthalate material, the improvement comprising pretreating said polyethylene terephthalate material prior to application of said adhesive composition by applying to the surface thereof at least one radiation-curable acrylate monomer and photopolymerizing said at least one acrylate monomer by exposure of the material to a radiation source to obtain surface modification of said polyethylene terephthalate material and said improved adhesion to rubber based materials.

26. The process of claim 25 wherein said polyethylene terephthalate material comprises a filament or yarn.

27. The process of claim 26 wherein said acrylate monomer is applied to said material as part of a spin finish.

28. The process of claim 27 wherein the spin finish is applied in a quantity between about 0.1 to 5 weight percent, based on the weight of the filament or yarn.

29. The process of claim 27 wherein the acrylate monomer is applied in a quantity of between about 0.05 to 2 weight percent, based on the weight of the filament or yarn.

30. The process of claim 25 wherein the acrylate monomer is a polyol polyacrylate compound.

31. The process of claim 25 wherein the acrylate monomer is a pentaerythritol polyacrylate compound.

32. The process of claim 25 wherein the acrylate monomer is pentaerythritol triacrylate.

33. The process of claim 25 wherein the acrylate monomer is tetraethyleneglycol diacrylate.

34. The process of claim 25 wherein the resorcinol-formaldehyde condensate/vinyl pyridine latex composition is cured by heat treatment subsequent to being applied.

35. The process of claim 25 wherein the acrylate-treated yarn is spun into cord prior to the application of the composition comprising resorcinol-formaldehyde condensate and vinyl pyridine.

* * * * *